United States Patent Office 3,319,776
Patented May 16, 1967

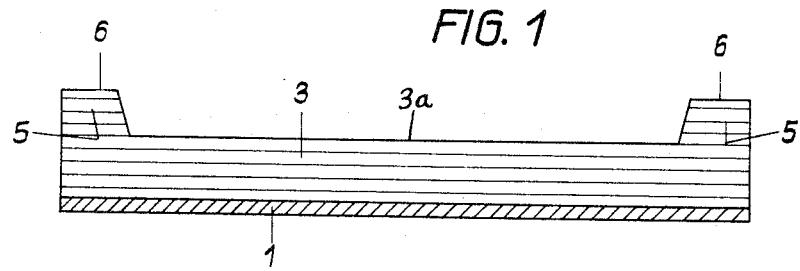
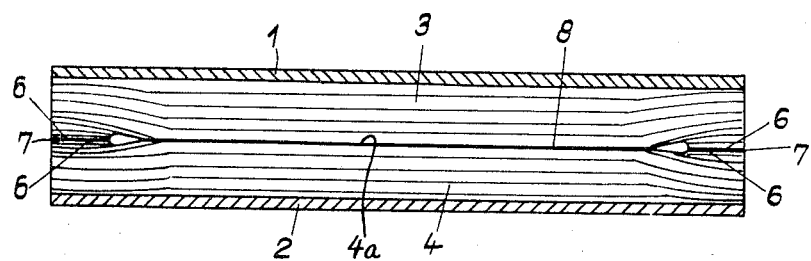
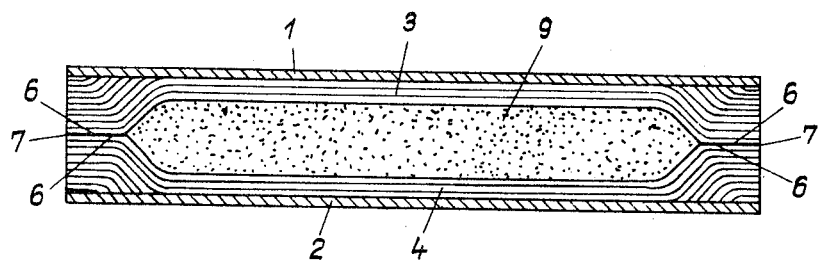

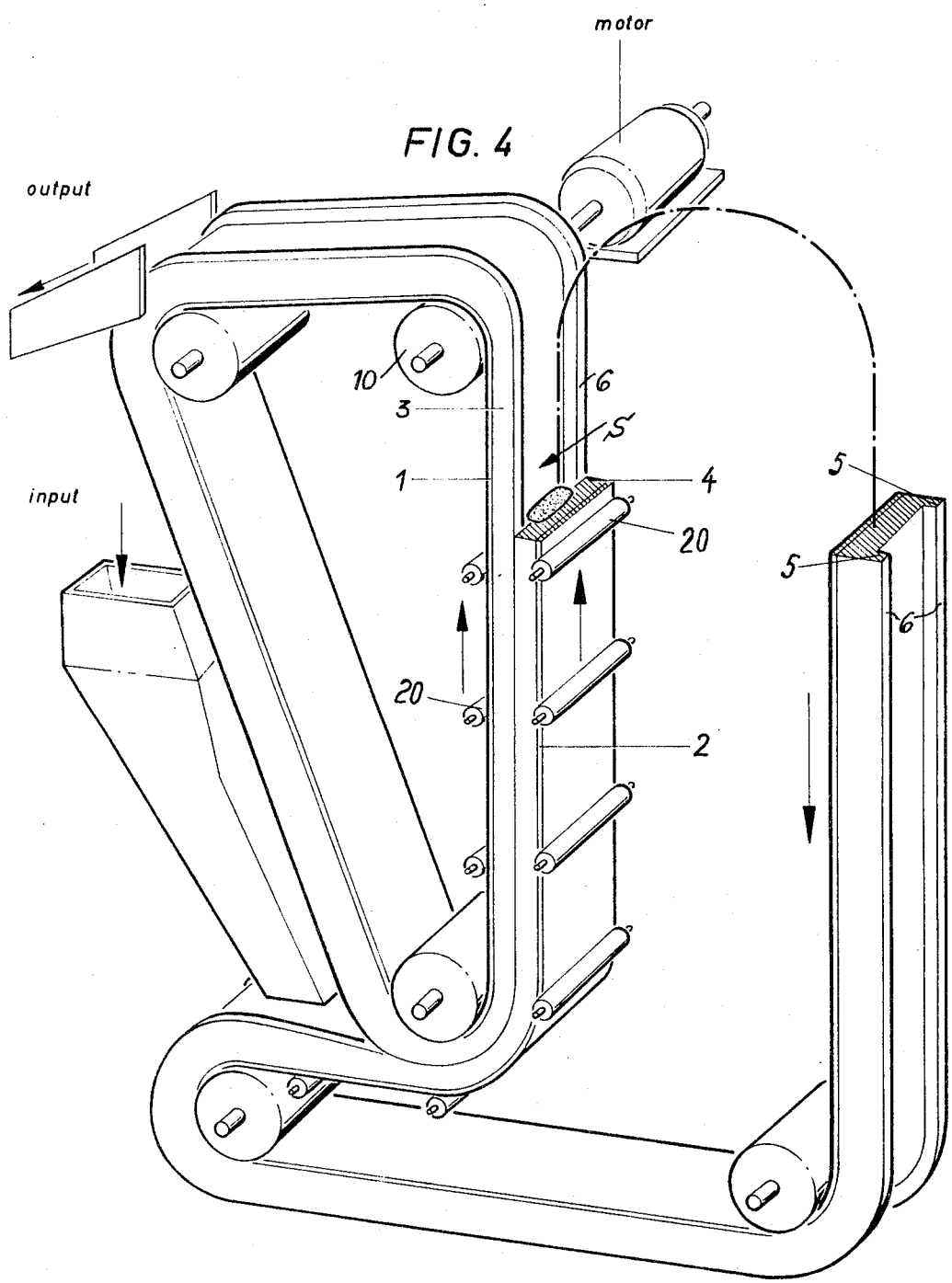

3,319,776
STEEP CONVEYOR INSTALLATION AND CONVEYOR BELT THEREFOR
Gert Bechtloff, Wolfgang Bruns, and Andreas Pitter, all of Wilhelmshaven, Germany, assignors to Beteiligungs- und Patentverwaltungsgesellschaft mit beschrankter Haftung, Essen, Germany
Filed Dec. 23, 1965, Ser. No. 515,339
Claims priority, application Germany, Dec. 30, 1965, B 79,950
4 Claims. (Cl. 198—165)

The present invention relates to a steep conveyor installation and conveyor belts therefor. Steep conveyor belt installations are known which have two conveyor belts in face to face relationship while those sides thereof which face each other are covered with layers of foam material for encasing the material to be conveyed at a steep angle.

According to one of these known installations intended for conveying solid articles, each of the articles is individually completely encased by the yieldable foam material consisting of foam rubber. While an arrangement of this type works satisfactorily for solid articles, a sealing problem has to be met when it is intended to convey bulk goods or pourable goods as, for instance, sand. In an effort to solve this problem, it has been suggested to provide the foam rubber-equipped conveyor belts with marginal toothed strips and to arrange these belts so that while the belts pass through the steep incline, the teeth of said toothed strips engage each other in a manner similar to the engagement of slide fastener sections.

An arrangement of this type, however, has the drawback that bulk goods get clamped between the teeth of said marginal strips so that a proper seal cannot be obtained. Moreover, the said marginal strips frequently cause disorders at the top station where said strips are deviated.

Another possibility of preventing bulk goods during their steep upward movement between the two conveyor belts from escaping laterally consists in guiding the conveyor belts through correspondingly arranged multi-part rollers so that the marginal portions of the belts will be trough-shaped while the concave sides of the belts face each other. Such an arrangement, however, causes difficulties at the top station where the trough-shaped portions will have to be flattened out in order to permit passing of the belts over the deviating drums.

It is, therefore, an object of the present invention to provide a steep conveyor installation and conveyor belts therefor, which will overcome the above mentioned drawbacks.

It is another object of this invention to provide a steep conveyor installation and conveyor belts therefor, which will assure a tight seal at the marginal portions of the conveyor belts while permitting an easy and proper deviation of the conveyor belts at the top station of the conveyor installations.

These and other objects and advantages of the invention will appear more clearly from the following specification in connection with the accompanying drawing, in which:

FIG. 1 is a cross section through a conveyor belt according to the invention covered with a yieldable layer of foam material.

FIG. 2 represents a cross section through two conveyor belts of the invention in a condition in which they move along the steep conveying path when not conveying any material.

FIG. 3 is a cross section corresponding to that of FIG. 2 but with bulk material being conveyed by and enclosed between the conveyor belts.

FIG. 4 is a diagrammatic representation of a steep conveyor installation with two conveyor belts according to the present invention.

The objects outlined above have been realized in conformity with the present invention by the fact that the marginal portions of the conveyor belts when not engaging each other form protruding ledges or strips which, when the belts move through the steep conveying path, are in pairs pressed against each other to such an extent that the joint between said marginal portions and the joint of the intermediate areas of said belts when no goods are being enclosed thereby, are located in substantially the same plane.

Referring now to the drawing in detail, each conveyor belt 1, 2 has one surface thereof covered by a layer 3, 4 of foam material. This foam material is a high porous material of great elastic yieldability and may consist of foam rubber or foam synthetic material such as microcellular-polyurethan or moltoprene. The foam material may be connected to the respective belt 1, 2 in any convenient manner for instance by gluing or frothing.

The layers of foam material have their marginal areas provided with ledges or strips 5 with contact or engaging surfaces 6. These strips 5 will, when the belt and foam material are under no load, protrude beyond the central portion 3a, 4a of the foam layer as shown in FIG. 1.

When the belts 1, 2 with the foam layers 3, 4 enter the steep conveying path generally designated S (FIG. 4), the surfaces 6 of the marginal strips 5 engage each other, and the foam material forming these strips is compressed to such an extent that these strips no longer protrude beyond the central portions 3a, 4a. This condition is shown in FIG. 2 from which it will be seen that the joints 7 between those marginal portions 5 which engage each other are located substantially in the same plane as the joint 8 along which the central portions 3a, 4a of the foam layers engage each other when no bulk material is between said layers 3 and 4.

In view of the considerable pressure at which the marginal foam material strips 5 are pressed against each other, a tight seal at the marginal areas of said layers 3, 4 will be obtained so that the bulk material 9 received between the belts for conveying the material along a steep path will be completely encased and to such an extent that no bulk material can escape laterally through the joints 7. The said seal at the joints 7 will be obtained without the necessity of providing intermeshing teeth at said marginal areas or strips so that a disorder-free movement and operation of the conveyor installation will be assured. When the belts 1, 2 pass about a deviating drum, for instance drum 10, at the upper end of the steep conveying paths, which may be called the top station, the marginal strips 5 will, due to the good stretchability of the foam material, cause no difficulties.

While passing through the steep conveying paths, the back side of the belts 1, 2 is in engagement with rollers 20 by means of which the foam material layers 3, 4 are pressed against each other or against the bulk material therebetween. These rollers 20 may be of a simple design and may consist of straight supporting rollers so that the costs therefor will be considerably less than when employing trough-shaped roller trains.

It is, of course, to be understood that the present invention is, by no means, limited to the particular belt construction shown in the drawings but also comprises any modifications within the scope of the appended claims. Thus, while the preceding description merely refers to conveying material upwardly along a steep path, the present invention is, of course, also applicable to conveying installations in which the material is conveyed downwardly along a steep path. The conveyor belts 1, 2 may consist of any suitable material as for instance micro-cellular-polyurethan or moltoprene.

FIG. 4 is a perspective view of a belt elevator with two endless conveyor belts according to the present invention, showing rolls 20 which in the ascendant path press the marginal areas of the layers 3, 4 of foam material one against the other, according to FIG. 3.

What we claim is:

1. A conveyor installation with a steep conveying path, which includes: two endless conveyor belts having a conveying section thereof arranged in fact-to-face relationship and extending over said steep conveying path, each of said belts comprising a first layer of strong load supporting flexible material and a second layer of soft elastic foam material connected to said first layer, the arrangement being such that over said steep path said second layers of foam material face each other and are adjacent to each other, each of said second layers having its longitudinal marginal portions designed thicker than the intermediate section between said marginal portions so that said longitudinal marginal portions of each belt form strips protruding beyond said intermediate section in a direction away from the first layer connected thereto, and means arranged adjacent said first layers of said belts over said steep path and operable to press said belts over said steep path against each other so that the abutting surfaces of said marginal portions form a substantial seal against bulk material.

2. An installation according to claim 1, which includes roller means arranged along said steep path and operable to compress said protruding strips to such an extent that their abutting surfaces are approximately flush with the adjacent surfaces of said intermediate sections when the latter are under no load.

3. A conveyor installation according to claim 1, in which said second layer is of foam rubber.

4. A conveyor installation according to claim 1, in which said first layer is of rubber material.

References Cited by the Examiner

UNITED STATES PATENTS

| 2,484,810 | 10/1949 | Bacon et al. | 198—165 X |
| 2,836,285 | 5/1958 | Muller | 198—165 |
| 2,896,773 | 7/1959 | Syce | 198—201 |
| 3,036,944 | 5/1962 | White et al. | 198—193 X |

FOREIGN PATENTS

| 1,070,222 | 2/1954 | France. |
| 1,123,345 | 6/1956 | France. |
| 897,383 | 5/1962 | Great Britain. |

EVON C. BLUNK, *Primary Examiner.*

M. L. AJEMAN, *Assistant Examiner.*